C. F. EATON, Jr.
MEASURING INSTRUMENT.
APPLICATION FILED FEB. 10, 1916.

1,282,553.

Patented Oct. 22, 1918.
4 SHEETS—SHEET 1.

UNITED STATES PATENT OFFICE.

CHARLES F. EATON, JR., OF NEW YORK, N. Y.

MEASURING INSTRUMENT.

1,282,553.   Specification of Letters Patent.   Patented Oct. 22, 1918.

Application filed February 10, 1916. Serial No. 77,363.

*To all whom it may concern:*

Be it known that I, CHARLES F. EATON, Jr., a citizen of the United States, residing at the city of New York, in the borough of Manhattan and State of New York, have invented certain new and useful Improvements in Measuring Instruments, of which the following is a full, clear, and exact description.

This invention relates to a calculating machine for determining the value of a quantity which is the product or the quotient of two variable quantities and has for its primary object the provision of an instrument which will give a direct reading of the value of the quantity to be determined. The invention has special application to vehicles where for example the two variable quantities are the distance to be traveled, and the time in which the distance should be covered. One way in which the invention may be utilized is to give a direct reading of the speed at which the vehicle must move in order to cover a predetermined distance in a definite time, for if the distance and time is known, the speed at which the vehicle must move is the quotient of the distance divided by the time.

The instrument is also adapted to be used as an average speed meter, in which instance the distance covered by the vehicle and the time consumed in covering this distance are divided which will give the average speed of the vehicle for the total distance covered from the start to the moment when the reading is taken. In order to provide an instrument which will give a direct reading of the quotient or product of two quantities, an instrument must be utilized which will mechanically determine the ratio between the two quantities whose quotient or product is to be determined and to do this, I utilize the relation between the factors of a trigonometrical function, as for example, tan. $a = \frac{a}{b}$ or $a = b$ tan. $a$. It is also evident that other trigonometrical functions can be utilized instead of the tangent, but it has been found that the tangent is preferable for the reason that the values of the tangent vary from zero to infinity and therefore will provide a full range scale. In embodying this principle in an instrument, the invention consists of two devices each of which has a part whose direction of movement is defined by one of the factors of a trigonometrical function and whose magnitude of movement is proportional to the value of one of the two variable quantities whose product or quotient is to be determined, together with mechanism under mutual control of each of said parts for determining the third factor of the trigonometrical function which is formed by the movement of one or both of the two aforesaid parts. Means is also provided for giving a direct reading of the value of the quantity to be determined which is in turn controlled by the mechanism actuated by both of said parts. Where the device is utilized as an average speed meter, one of these parts is moved proportionately to the time and the other of the parts is moved proportionately to the distance and the trigonometrical function selected is one which will give the ratio of the displacements of the two parts which is equal to the distance divided by the time. For example, if the tangent is selected and tan. $a = \frac{a}{b}$, the value by making $a$ proportionate to the distance and $b$ to the time, the angle will be found, and the tangent will give the quotient of the two variable quantities.

In so far as I am aware, it has never heretofore been contemplated to provide an average speed meter having two parts, one of which is moved proportionate to the time and the other proportionate to the distance, together with means associated with these parts for determining their quotient, and it is my intention to cover this feature broadly irrespective of whether the mechanism utilized for obtaining the quotient operates in accordance with a trigonometrical function or not.

The invention also consists of the combinations and constructions which will be apparent to one skilled in the art from the illustrated embodiment of the invention shown herein and the detailed description thereof, and will be particularly pointed out in the appended claims.

In the accompanying drawings:

Figure 1 is a side elevation of an instrument constructed in accordance with the principles of my invention;

Fig. 2ª is a detail of the time indicator dial;

Figures 1, 2A:
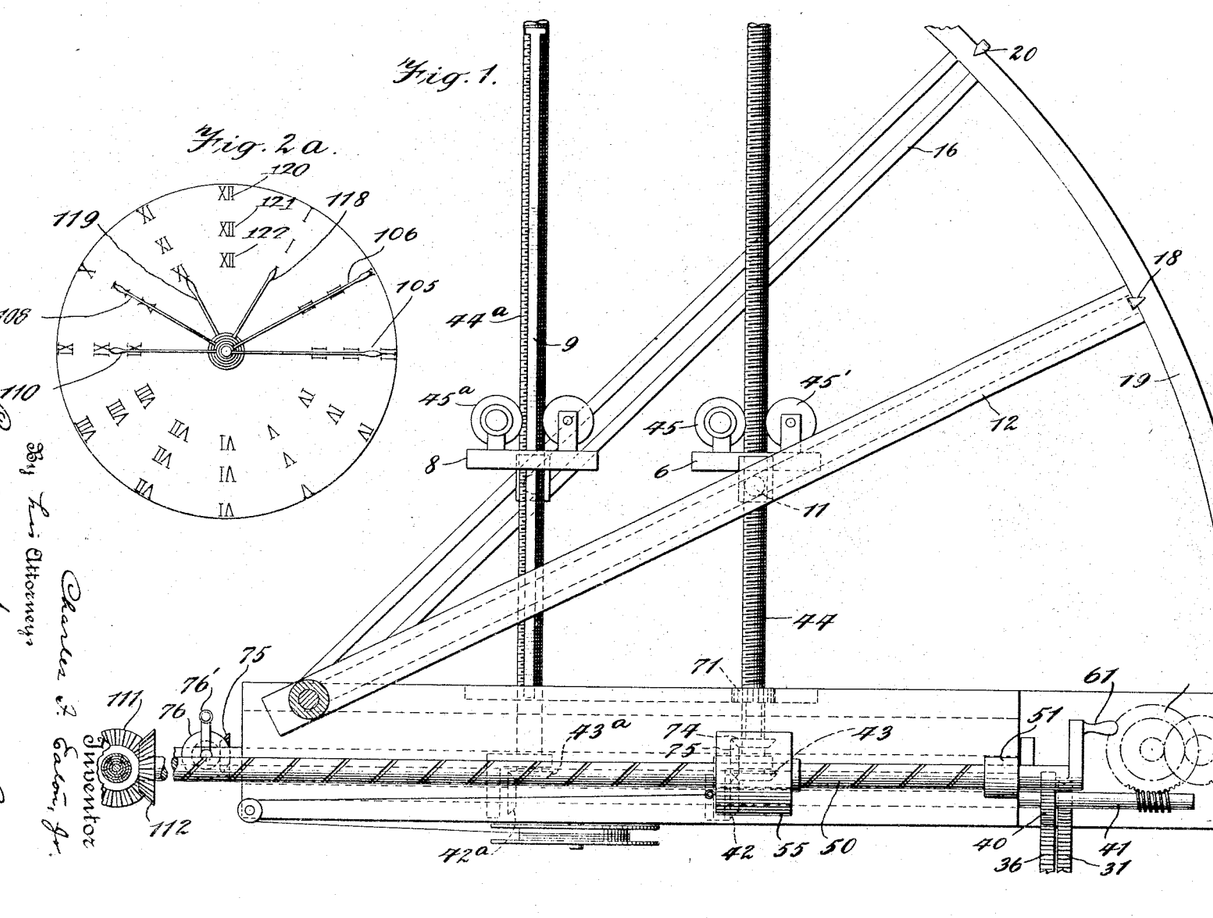
Figures 2, 3, 4:
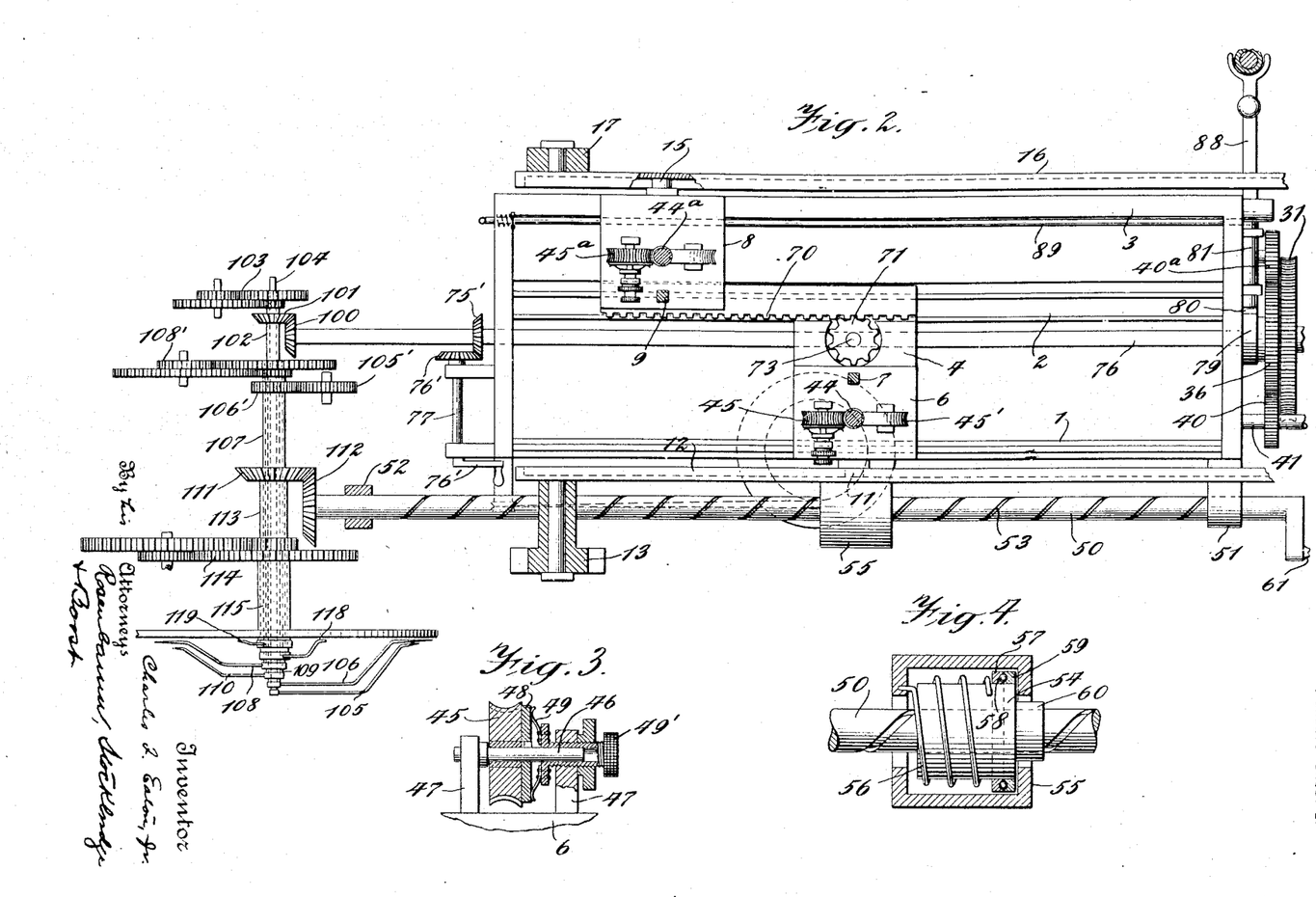
Fig. 2 is a plan view of the same on an enlarged scale with parts omitted.
Figs. 3 and 4 are details of the actuating mechanism.

In Figs. 1 to 7, inclusive, there is shown an instrument which is adapted to give a direct reading of the speed at which a vehicle must travel in order to cover a predetermined distance in a certain time. Provision is also made in this instrument for permitting the vehicle to remain at rest for a determined time interval within the total time to be covered by the trip and for leaving out of consideration in determining the average speed the time during which the vehicle is at rest. As for example, where a trip of 120 miles is to be made in 9 hrs. and it is known that an hour must be taken out for lunch, by my instrument the average speed at which the vehicle must travel both before and after lunch, will be correctly determined. These results are accomplished by mechanism which will now be described. The instrument is mounted upon a suitable base which carries standards 1, 2 and 3 (see Fig. 7). Mounted in suitable slide-ways or grooves in the standards 1 and 2, is a table 4, while mounted on the standards 2 and 3 also in suitable grooves or slide-ways is a table 5. Mounted upon the table 4 is a platform 6 which is adapted to be moved vertically and is guided in its vertical movement by a rod 7 fastened at its lower end to the table 4. In the same manner, a platform 8 is mounted upon the table 5 and is adapted to have a vertical movement being guided in its vertical movement by a vertically-disposed rod 9 which is secured at its lower end to the table 5. The rod 9 has an abutment or enlargement 9′ at its upper end and the rod 7 is also provided with a similar abutment not shown. The platform 6 carries an arm 10 having an offset pin 11 which rides in a groove in an arm 12 which is swingingly mounted upon the base in a suitable bearing 13. In the same manner, the platform 8 carries an arm 14 having a pin 15 which slides in a groove in an arm 16 which is swingingly mounted in a bearing 17 and as is shown by Figs. 1 and 2, the bearings of these two arms are in axial alinement. The arm 12 carries at its outer end a pointer 18 which coöperates with a scale 19. In the same manner, the arm 16 carries a pointer 20 which is secured to a laterally-extending arm 21 so that it also coöperates with the scale 19 (see Fig. 5).

Referring now to Fig. 1, it will be seen that the angular position of the arm 12 is determined by the position of the pin 11, and it will also be seen that the position of this pin depends upon the longitudinal movement of the table 4 and the vertical movement of the platform 6, or in other words, in any position of the pin 11, a right-angled triangle is formed, one side of which is determined by the distance, the platform 6 is above the table 4, which distance has been indicated $a$ on the drawing and also is determined by the horizontal distance between the pivotal point of the swinging arm 12 and the portion of the table 4, which is in vertical alinement with the center of the pin 11, which distance is indicated $b$. If, therefore, the platform 6 is moved vertically proportionately to the distance and both the table 4 and the platform 6 are moved horizontally proportionately to the time, the angular position of the arm 12 may be utilized to determine the ratio between the values of the quantities to which the movement of these parts is proportionate, for by utilizing the equation $\tan. a = \frac{a}{b}$ and since $a$ is proportionate to the distance and $b$ proportionate to the time, the angular position of the arm 12 may be utilized to give a direct reading of the distance divided by the time or average speed of the vehicle. If, on the other hand the pin 11 is first manually moved or set, say, to the position shown in Fig. 1, so that the distance designated $a$ corresponds to the total miles to be covered, and is also manually moved horizontally toward the right so that the distance $b$ corresponds to the total time to be consumed in covering the total distance to be traveled, and then both the table and platform are moved horizontally toward the left proportionately to the time during the time which the vehicle travels by suitable clock work, and the platform 6 is moved downwardly proportionately to the distance by suitable mechanism connected to the wheel of the vehicle, the position of the pin or the angular position of the arm 12 will determine the miles per hour at which the vehicle must travel in order to cover the total distance which is yet to be traveled in the time which remains to cover this distance.

Figures 5, 6, 7:
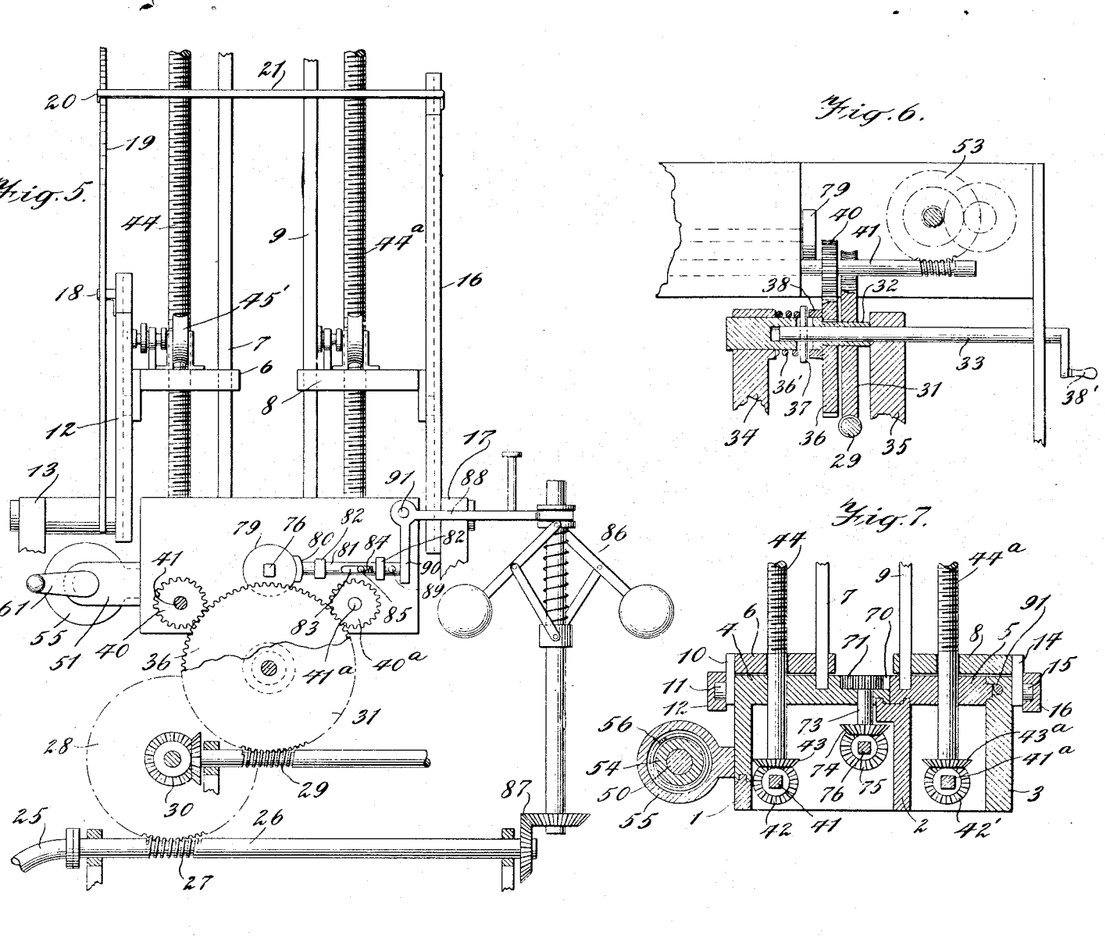
Fig. 5 is an end elevation of the instrument.
Figs. 6 and 7 are details of the actuating mechanism.
Figure 8:
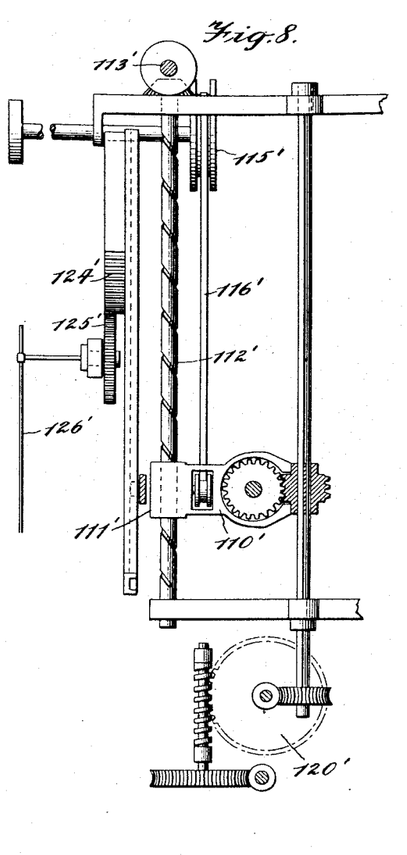
Fig. 8 is a plan view of a modified form of a more simple construction.
Figure 9:
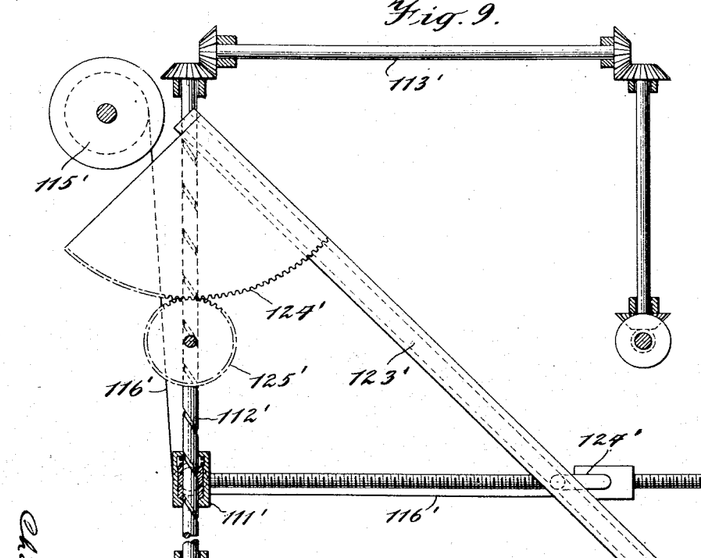
Fig. 9 is a side elevation of Fig. 8.
Figure 10:
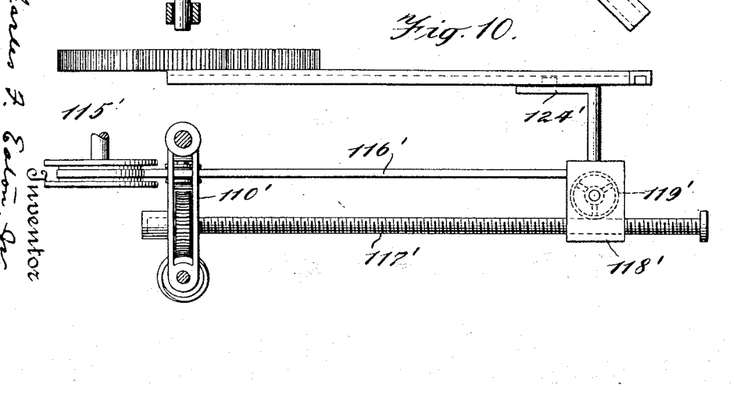
Fig. 10 is an end elevation thereof.

The embodiment of the invention shown in Figs. 1 to 7, inclusive, is designed to indicate the speed at which the vehicle must travel in order to cover a determined distance in a determined time, while the modification shown in Figs. 8, 9 and 10 is designed to indicate the average speed of the vehicle for a predetermined time. Referring, therefore, to the instrument whereby the platform is moved vertically until it reaches a position in which the distance $a$ is proportionate to the total miles to be covered, and is then moved downwardly distances which are proportionate to the distance which the vehicle travels, the downward movement of the platform 6 is controlled from one of the wheels of the vehicle (not shown) which drives a flexible shaft 25 (Fig. 5) which in turn drives a shaft 26 carrying a worm 27 which meshes with a worm wheel 28, which drives a worm 29 through the bevel gears 30. The worm 29 drives a worm wheel 31, which is loosely mounted upon a sleeve 32 into which is telescopically fitted a shaft 33 (Fig. 6). The sleeve 32 is rotatably mounted in a suitable bearing 34 and the shaft 32 in a similar bearing 35. Keyed to the sleeve 32 is a gear wheel 36 which in the normal operation of the instrument is pressed into frictional contact with the worm wheel 31 to clutch these parts together by means of a spring 36' mounted upon the sleeve 32 and bearing at one end against the bearing 34 and at its other end against a pin 37. The pin 37 passes through elongated slots in the sleeve 32 and is fastened in a suitable aperture in the shaft 33. This pin 37 presses against a collar 38 which in turn, through the tension of the spring, will press the gear wheel 36 against the worm wheel 31 to clutch these parts together. The shaft 33 carries at its free end a handle 38', which, when pushed to the left, will force the pin 37 against the spring 36' and hence will disconnect the worm wheel 31 from the gear wheel 36 and permit the gear wheel to be independently rotated. The gear wheel 36 meshes with a pinion 40 carried by a shaft 41 supported in the base of the machine. The shaft 41 extends longitudinally the entire length of the machine and is of a square cross section. Mounted upon this shaft so as to permit a longitudinal movement therealong, is a bevel pinion 42 which meshes with a bevel pinion 43 carried at the end of a vertically-disposed shaft 44 which extends upwardly through the table 4 and has a bearing in the same and extends loosely through an opening in the platform 6. The shaft 44 is threaded for its entire length with the exception of the lower end thereof which has a bearing in the table 4. The platform 6 carries a worm pinion 45 (Fig. 3) which is loosely mounted upon a shaft 46 supported in standards 47 carried by the platform. This worm wheel is loosely mounted upon the shaft 46 and arranged against one face thereof is a friction disk 48 which is held in engagement with the face of the worm wheel by means of springs 49, the tension of which may be adjusted by a threaded thumb knob 49' to vary the frictional engagement between the disk and pinion 45. The shaft 46 is stationary and therefore during the normal operation of the instrument, the worm pinion 45 will also be stationary so that upon rotation of the threaded shaft 44, a vertical movement will be imparted to the platform 6 either upwardly or downwardly depending upon the direction of rotation of this part. When, however, the platform 6 reaches the upper limit of its vertical movement and strikes an abutment (not shown, which is similar to the abutment 9' already described) at the upper end of rod 7, which prevents any further movement, the worm wheel 45 will then be forced to rotate which will prevent any breakage of the parts due to a careless handling of the instrument. The worm pinion 45 is held in engagement with the shaft 44 by a friction wheel 45'. Upon the extreme right hand end of the shaft 41, as is shown in Figs. 1 and 6, there is mounted a worm 41' which actuates an indicator 48'. This indicator is only diagrammatically shown and is of the usual construction, and controls a rotating pointer which travels over a scale calibrated in miles. When, therefore, the handle 38 is pushed to the left, as described in connection with Fig. 6, and the gear wheel 36 is alone rotated, the platform 6 by the construction described, may be moved vertically until the indicator 48' gives a reading which will determine the position of the pin 11 in accordance with the total miles which are to be covered by the vehicle and for which the instrument is to be set. After it is set, the shaft 32 is permitted to resume its normal position which will clutch the worm wheel 31 and gear wheel 36 together, so that when the vehicle is moving the pin 11 will have a downward movement which is proportionate to the distance covered by the vehicle.

Referring now to the mechanism whereby both table 4 and platform 6 have imparted to them a horizontal movement which is proportional to the time to be consumed in traveling the total number of miles. Broadly stated, this mechanism comprises, in the form shown in Figs. 1 to 7, inclusive, means for manually moving the table 4 and platform 6, to the right, and for automatically moving these parts to the left distances which are proportionate to the time. This mechanism comprises a shaft 50 which is mounted in suitable bearings 51 and 52 upon the base of the instrument, which shaft is provided with a spiral cam-track 53. A traveling nut 54 (see Fig. 4) is adapted to be held stationary and upon rotation of the shaft 50 will be moved longitudinally along the same. This traveling nut is mounted in a casing 55 which is secured to the table 4 (see Figs. 4 and 7) and is normally held against rotation with respect to this casing by a spring 56 surrounding the traveling nut, which spring is secured at one end to the casing 55 and at its other end to an annular ring 57. The ball race 57 is loosely mounted for rotation upon the cylindrical traveling nut 54 and a second annular ring 59 is fastened thereto, the rings being separated by the balls 58. Normally the tension of the spring 56 will hold the ring 59 in frictional engagement with the wall of the casing 55 which will prevent any rotation of the traveling nut and constrain it to move longitudinally along the shaft 50 by engagement of the nut with the cam track 53. If, however, upon movement of the table 4, and the casing 55 attached thereto, to the left, these parts reach the limit of their position, the casing 55 is then engaged by an abutment 52 which will cause the stoppage of the table 4 and casing 55, but the nut 54 will continue to advance until the annular ring 59 is brought out of frictional contact with the wall of the casing. The nut will then be free to revolve and since the annular ring 57 still remains stationary due to its attachment to the spring 56, the two rings will rotate relatively to each other and the friction between them will be taken up by the balls 58 which will permit the nut 54 to rotate with the shaft 50 without any tendency for a longitudinal movement therealong. In the same manner, if the table 4 and associated parts are moved to the extreme right hand position, a hub 60 upon the nut 54 which projects through an opening in the casing 55 (see Fig. 4) will come into engagement with the abutment, as for example, the bearing 51 which will, as before, throw the annular ring 59 out of frictional engagement with the walls of the casing and permit the nut to revolve. There is, of course, some friction between the bearing and the hub 60, but this increased resistance will notify the operator that he has manually moved the platform 4 and associated parts to its extreme right hand position. This movement of the platform 4 and associated parts to the right, is accomplished manually by means of a handle 61 secured to the right hand end of the shaft 50. The movement of these parts to the left is obtained by means which is connected to the works of a clock mechanism to rotate the shaft 50 one revolution for each hour so that the distance that the table 4 and the platform 6 will be advanced toward the left for each hour, is equal to the pitch of the spiral cam track 43. This means for connecting the shaft 50 to the works of the clock will be hereinafter described.

The table 5 and platform 8 will, in the normal operation of the device, be moved longitudinally or horizontally with the table 4 and platform 6, although these parts are capable of independent movement since they are separately mounted in suitable slide-ways formed upon the parts 1, 2 and 3, as will be clear from Fig. 7 of the drawing, however, these parts are connected for simultaneous movement by a rack 70 secured to the table 5 which engages a pinion 71 mounted in a recess in the table 4 for if the pinion 71 is held from rotation as in the normal operation of the device. When it is, however, desirable in setting the instrument and during its operation under some conditions, to permit relative movement of the tables 4 and 5, this is accomplished by the following construction: The pinion 71 is mounted upon a shaft 73 which is carried by a bevel gear 74 which meshes with a bevel gear 75 mounted upon a shaft 76 extending the entire length of the instrument. This shaft, for a portion of its length, is square in cross section as shown in Fig. 7 and the bevel gear 75 is loosely mounted on the square portion thereof, so that it may travel along the same. Secured to the shaft 76 at its left hand end is a bevel gear 75' which meshes with a bevel gear 76' carried by a shaft 77 which is adapted to be manually actuated by a crank 76'. It will be seen that upon rotation of the shaft 77, the pinion 71 will be actuated and the relative positions of the tables 4 and 5 in this manner changed. The shaft 76 at its right hand end carries a brake disk or wheel 79, with which a brake 80 engages (see Fig. 5) so that when the brake is in engagement with the disk, the pinion 71 will be prevented from rotating and the tables 4 and 5 will move together. The brake 80 is connected to a bar 81, which slides in suitable bearings 82. The sliding bar 81 is provided with a slot 83 in which is fitted a spring 84, one end of which bears against a stationary pin 85 fixed to a part of the instrument, so that the tension of the spring is exerted to maintain the brake 80 out of engagement with the brake wheel. This brake is moved into engagement with the brake wheel by means of a governor 86 which is actuated from the shaft 25 through gearing 87, the governor actuating a bell crank lever 88, the free end of which is adapted to engage a rod 89 slidably mounted upon the sliding bar so that when the vehicle is in motion, the arm 90 of the bell crank will be pressed against the rod 89 to throw the brake 80 into engagement with the brake disk 79 and thus prevent its rotation. The bell crank lever 88 is mounted upon a shaft 91, which as is shown in Fig. 7, fits in the slide-way upon the standard 3, in which the table 4 rides, and is elliptical in cross section providing a cam so that when the governor resumes its normal position, the cam shaft 91 will be pressed against the slide-way of the table 5 and prevent its movement, but when the vehicle is in motion and the governor 86 actuated, the cam shaft 91 will be moved to permit the free longitudinal movement of the table 5. The rod 89 extends the entire length of the instrument and carries an abutment at its left hand end which is adapted to be engaged by the table when in its extreme left hand position which will pull the end of the rod out of the path of the bell crank 88.

The platform 8 mounted upon the table 5 is given a vertical movement which is in all respects similar to the vertical movement of the platform 6. This is accomplished by means of a threaded shaft 44$^a$ which meshes with bevel wears 43$^a$ and 42$^a$, the bevel gear 42' being carried by a shaft 41$^a$, which is rotated by a pinion 40$^a$ which engages the gear wheel 36 in the same way as does the pinion 40 and its associated parts. A worm pinion 45$^a$ and associated parts are also provided.

Referring now to the left hand end of Fig. 2 and the supplementary Fig. 2$^a$, the time indicator will now be described. The shaft 76 carries at its extreme left hand end a bevel pinion 100 which engages with a bevel pinion 101 which is carried by a hollow tubular shaft 102 and actuates reducing gear wheels 103, and a solid shaft 104. The shaft 104 carries at its other end a pointer 105 and the hollow shaft 102 carries at its other end a pointer 106. The gearing 103 is so designed that the pointer 106 is moved twelve times as fast as the pointer 105 as in accordance with the hands of a clock. The time controlled mechanism for actuating the shaft 50 is not shown, as any form of clock mechanism may be used and therefore only one pinion of such clock mechanism is illustrated which is designated 105'. This pinion is in engagement with a pinion 106' carried by a tubular shaft 107 which carries at its other end a pointer 108. The tubular shaft 107 drives through the reducing gears 108', a tubular shaft 109 which carries at its other end a pointer 108, the pointer 110 being moved twelve times as fast as the pointer 108 and therefore corresponds to the hands of a watch or clock. The tubular sleeve or shaft 107 has secured to it a bevel gear 111 which gear meshes with a bevel gear 112 carried by the shaft 50 to cause the automatic longitudinal movement of the tables toward the left as has been described, and it will be noted that since the tubular shaft 107 corresponds to the minute hand 108 of the clock mechanism this shaft will make one revolution in an hour and will thus advance the tables a distance corresponding to the pitch of the spiral cam track 53 as described. The pinion 111 should be connected to the works of the watch as indicated by gear 105' so that the shaft 50 may be manually rotated by the handle 61 without injuring the works of the clock, similar to the manner in which the hands of a clock may be manually rotated. The bevel gear 111 also carries a tubular shaft 113, which through multiplying gears 114 actuates a tubular shaft 115. The tubular shafts 113 and 115 are connected, respectively, with two hands 118 and 119 at their ends, the speed of the hand 118 being twelve times that of the speed of the hand 119. The hands 105 and 106, and 108 and 110, and 118 and 119, respectively, are adapted to co-act with dials 120, 121 and 122 which are partially shown in Fig. 2$^a$, these dials in each instance being similar to the dial of a clock. On the dial the hands 108 and 110 indicate the true time through clock mechanism which is not shown in detail, but is indicated by the pinion 105'.

The manner in which the instrument is used may best be explained by giving a concrete example. Let us assume that the driver of the vehicle starts at 9 a. m., which time will be indicated by the hands 108 and 110 on the indicator shown in Fig. 2$^a$. Let us also assume that the distance to be traveled is 120 miles and that it is desired to reach the destination at 6 p. m., and that an hour will be taken for lunch, during which time the vehicle is at rest. By properly setting the instrument the speed at which the vehicle should be driven at all times in order to reach the destination at the appointed time can be directly read from the pointer 20 which coöperates with the scale 19. To set the instrument the handle 61 is turned to rotate the shaft 50 and move the table 4 and associated parts through the connection described, to the right, the amount of movement being indicated by the hands 118 and 119. The rotation of 50 is continued until these hands register 6 p. m.; that is, the table 4 and associated parts have been moved to the left a distance which corresponds to the difference between 6 p. m. and 9 a. m., which is nine hours, which is the total time to be consumed in traveling and for lunch. The handle 76' is then rotated to rotate the pinion 71 through shaft 76, to vary the relative positions of the tables 4 and 5. The rotation of the shaft 76 is continued until the hands 105 and 106 indicate the stoppage time of one hour, the rotation necessary to bring the hands to this position being such as to make the distance between the tables 4 and 5 equal the distance which one of the tables travels in an hour, or equal to the pitch of the spiral cam track 43. The platforms 6 and 8 are then raised by rotating the threaded shafts 44 and 44$^a$, respectively, through the gear 36 connected to the shaft 33, which is rotated by means of crank 38. The amount which the platforms are raised is indicated by the indicator 48'', and when this indicator registers 120 miles the platforms are permitted to remain in that position. The arm 12 carrying the pointer 18 will then be in an angular position to indicate upon the scale the ratio of $\frac{a}{b}$, and since $a$ is 120 miles and $b$ 9 hours, the reading upon the scale 19 at the pointer 18 will be 13 3/10 miles. The other arm 16, which is connected to be actuated by the pin carried by the platform 6, which has been moved to a position to compensate for the stoppage time or to a position where its longitudinal position corresponds to 8 hours, and the angular position of the arm 16 and pointer 20 will indicate upon the scale the ratio of $\frac{120}{8}$ miles, which is 15 miles per hour, the correct amount at which the vehicle should be driven in order to reach the destination at the proper time. It may here be stated that only the pointer 20 is essential and the other pointer 18 and arm 12 may be eliminated if desired. As will be clear, after the vehicle has started the two platforms 6 and 8, respectively, will be moved downwardly distances corresponding to the distances covered by the vehicle since they are connected to the shaft 20, which is connected to a rotating part driven from the wheels or the other part of the vehicle, and at the same time the tables 4 and 5, respectively, will move toward the left, due to the rotation of the cam shaft 50, which is now being driven by the clock movement through the gear 105. The angular position of both the arms 12 and 16 will therefore be varied in proportion to the quotient of these two quantities, and if the vehicle runs at less than the required rate of speed for a short period of time, then there will be indicated upon the scale a reading which will be greater than 15 miles per hour for the pointer 20, it being understood that the pointer 20 is the one by which the reading is taken. The angular position of this pointer will continue to change according to the distance traveled, until the vehicle is stopped for lunch, when the governor 86 will resume its normal position and the brake 80 will be removed from the brake wheel 76. During the time the vehicle is at rest the table 4 will continue to advance toward the left, since the clock mechanism remains in operation, but since the pinion 71 is now free to rotate, the platform 5 will remain in the same position as it occupied at the instant the vehicle was stopped. After the lapsing of one hour the two platforms will be opposite each other and the angular position of both the arms 12 and 16 will be the same. It might be stated that during this longitudinal movement of the table 4 the table 5 is prevented from movement by the cam shaft 91 upon which is mounted the bell crank lever 88 operated by the governor. After the lunch hour has been consumed the vehicle is then started and both arms will occupy the same angular position. Just as soon as the vehicle is started the brake 80 is again brought into engagement with the brake wheel 79, which will constrain both tables 4 and 5 to move longitudinally together. The angular position of either arm will then vary according to the distance covered, and the time, and will at all times give a true reading of the required rate of speed at which the vehicle must be driven to reach the destination at the appointed time. When the destination is reached the clock-work is then stopped and the instrument may be reset when a new trip is started.

Referring now to the modifications shown in Figs. 8, 9 and 10, the principle of operation of this device is similar to that shown in the other views, but the function which it performs is somewhat different, since with the simplified form shown in these views it is possible to obtain continuously the average speed at which a vehicle is being driven.

Referring now to the construction of the same, a table 110′ is utilized which corresponds to table 4. This table carries a traveling nut 111′ which engages a spiral cam shaft 112′ which, through suitable gearing 113′, is adapted to be rotated at a certain predetermined rate, as for example, so that the shaft 112′ makes 1 revolution in one hour. The traveling nut will, therefore, advance the platform a distance equal to the pitch of the spiral cam track upon the shaft 112′ in one hour. In this form, however, the traveling nut 111′ is adapted to be automatically moved from left to right rather than from right to left, and to return it to its initial position a drum 115′ is used, which carries a cord 116′ connected to the traveling screw. The traveling nut 111′ is of the same construction as that shown in Fig. 4. Mounted upon the table 110′ is a threaded screw shaft 117′ which carries a platform 118′ similar to the platform 6 of the first modification described. The platform 118′ carries a worm wheel 119′ which is of a similar construction to that shown in Fig. 3. The screw threaded shaft 117′ is mounted on the table 110′ and is adapted to be driven by gearing 120′ which is connected to some part of the vehicle which is driven in accordance with the distance traveled; that is, similar to the connection to the shaft 25 of the first modification described; the gearing 120′ actuates a shaft 121′ which carries a worm 122′ keyed to and slidably mounted upon the shaft 122ᵃ, and the worm 122′ engages a worm wheel 122ᵇ mounted upon the shaft 117′. The shaft 117′ is rotated in a direction to cause the platform 118′ to move upwardly and this platform is returned to its lowermost or normal position by means of a continuation of the cord 116′, for if the platform 118′ is moved bodily downwardly the worm wheel 119' will rotate by virtue of the construction shown in Fig. 3, and after the platform 118' rests upon the table 110' a further pull upon the cord 116' will move both of these parts toward the left, to their initial position. An arm 123' similar to the arm 12 is pivotally mounted and in the groove in the same a pin 124' carried by the platform 118' is fitted so that the angular position of this arm will depend upon the longitudinal and vertical displacement of the platform. Instead, however, of having the arm 123' indicate upon a circular scale by means of a pointer at its ends, the construction shown in Fig. 9 may be utilized, which comprises a toothed sector 124' carried by the arm, which meshes with a pinion 125'. The pinion 125' carries a pointer 126' which co-acts with a scale so designed that the angular position of the pointer will give a direct reading in miles per hour. In using this form of instrument, the platform 118' is first moved until it occupies its initial position upon the table 110, and both of these parts are then moved toward the left until they are at a position corresponding to zero upon the scale with which the pointer 126' coöperates. The platform 118' is connected to the moving parts of the vehicle to be moved vertically distances proportional to the distance covered by the vehicle, and since the platform 18 is also moved to distances, which are proportional to the time, the angular position of the arm 123' will through the pointer 126, define the tangent of the angle which the arm 123' makes with its base; or in other words, the tan. $a = \frac{a}{b}$.

Since $a$ equals the distance covered by the vehicle, and since $b$ is proportional to the time consumed, the pointer 26 will always indicate the average speed which the vehicle has been moving for a predetermined time, and this will be true irrespective of any variation in speed of the vehicle, since all variations in speed will vary the rate of vertical displacement of the platform 18. The driver of the vehicle may therefore, by looking at his scale, tell at any moment what has been the average speed of the vehicle from a certain time up to the present, which will inform him whether or not he will have to increase his speed in order to reach a certain place within an appointed time. For example, if he knows at the outset that he has 120 miles to cover in 4 hours, and at the end of the first hour the instrument indicates that the average speed has been only 20 miles, then he understands that he must increase the speed sufficiently to bring the pointer to indicate 30 miles, for if he can keep the pointer so that it will indicate 30 miles, then he will reach his destination at the appointed time.

While the instrument described has a special application to speedometers with a vehicle such as automobiles, railway trains and the like, yet there are many instances in which it is desirable to obtain the product and quotient of two variable quantities, and it is not my intention to limit that phase of the invention wherein the trigonometrical functions are utilized, to determine the product or quotient of these values to their use with a speedometer.

I claim:

1. A machine of the class described comprising a rotary shaft, a part slidably mounted on said shaft carrying a second rotary shaft, a part movably mounted on said second named shaft, a pivotally mounted arm, a slidable connection between said last named part and said arm, means for moving said parts upon rotation of their respective shafts and an indicating mechanism actuated by said arm.

2. A machine of the class described comprising a rotary shaft, a part mounted thereon adapted to travel therealong upon rotation of the shaft, said part carrying a second rotary shaft, a part mounted on said second named rotary shaft also adapted to travel therealong upon rotation of the shaft, a swinging arm, said last named part having a slidable connection with said swinging arm and indicating mechanism operatively associated with said swinging arm.

3. In an average speedometer, a member having a movable part, a second member carried by said part also having a movable part, said members being disposed at right angles to each other, a clock connected to one of said parts for displacing it proportionally to the total time, means adapted to be connected directly to the moving device whose average speed is to be determined for displacing the other of said parts proportional to the total distance, a pivoted member slidably connected to said last named part, an average speed scale having a pointer actuated by said pivoted member, and means for returning said movable parts to their normal position after being displaced by said clock and distance control means.

4. In an average speedometer, a screw shaft, a traveling nut thereon, a second screw shaft carried by said traveling nut and carrying a second traveling nut, a swinging member slidably connected to said last named nut, a clock for rotating one of said shafts proportional to the time, means for rotating the other of said shafts proportional to the distance, and a clutch connection between each of said traveling nuts and their respective screw shafts permitting said nuts to be returned to their normal position independently of the rotation of said shaft.

5. In an average speedometer, a swinging arm, a part whose direction of movement is parallel to a line extending through the pivotal point of said arm, a second part movable parallel to said first named part, a third part carried by said second named part and movable at right angles thereto, means connected to said part for controlling the angular position of the swinging arm, means for moving said first named part proportionately to the time, a clutch connection between said first and second named parts normally coupling said parts together, and means for moving said third named part proportionately to the distance.

6. In a meter of the class described, a movable part, time-controlled means for moving said part, a second movable part, distance-controlled means for moving said second named part, means for displacing each of said parts from a normal position to a position corresponding to the total time and total distance, respectively, independently of said distance and time control means, and means associated with said parts for indicating the ratio between the distances which said parts are from their normal positions while being moved toward said positions by said time and distance-controlled means, respectively.

7. In a meter of the class described, a movable part, means for automatically moving said part proportional to the distance, means for manually setting said part to a position corresponding to the total distance to be covered independently of said automatic means, a second movable part, means for automatically moving said part proportional to said time, means for displacing said second named part a distance corresponding to the total time to be occupied in traveling the total distance for which said first named part has been set independently of said time control means, and means associated with each of said parts for indicating the ratio between their movements.

8. In a meter of the class described, a movable part, time-controlled means for moving said part in one direction, a second movable part, distance-controlled means for moving said part in one direction, means associated with each of said parts for moving them in the opposite directions to which they are moved by said time and distance-controlled means from normal positions in amounts proportional to the total distance and total time, respectively, and independently of said time and distance control means, and means associated with said parts for indicating the ratio between the distance which each of said members must be moved to return to its normal position while it is being moved toward said normal position by said time and distance-controlled means, respectively.

In witness whereof I subscribe my signature in the presence of two witnesses.

CHARLES F. EATON, Jr.

Witnesses:
WALDO M. CHAPIN,
JULE E. ZELENKA.